G. MORTIMER.
LOCKING AND ADJUSTING DEVICE.
APPLICATION FILED MAR. 8, 1918.
1,313,409.
Patented Aug. 19, 1919.
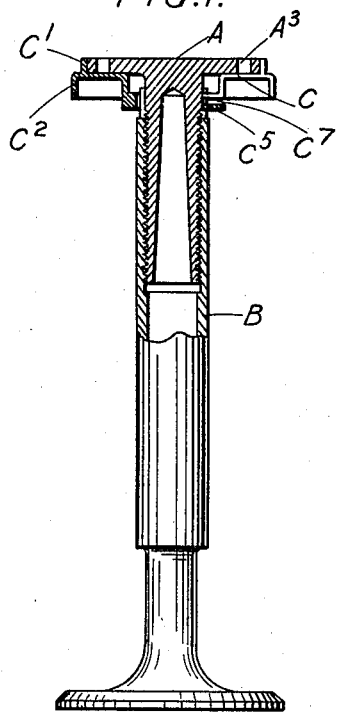
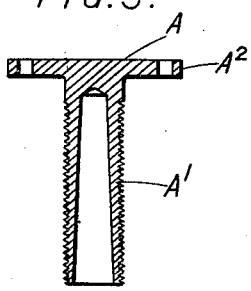
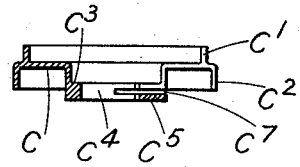
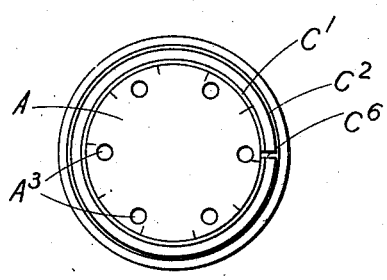
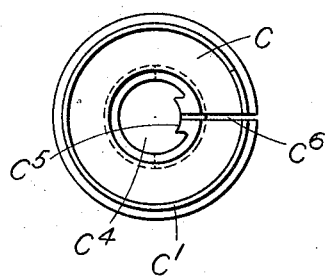
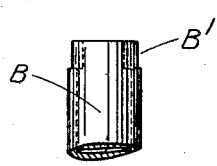
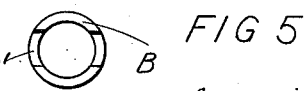
Inventor:
George Mortimer

UNITED STATES PATENT OFFICE.

GEORGE MORTIMER, OF SOMERSET, ENGLAND, ASSIGNOR TO D. NAPIER & SON, LIMITED, OF LONDON, ENGLAND.

LOCKING AND ADJUSTING DEVICE.

1,313,409. Specification of Letters Patent. Patented Aug. 19, 1919.

Application filed March 8, 1918. Serial No. 221,331.

*To all whom it may concern:*

Be it known that I, GEORGE MORTIMER, a subject of the King of England, and residing at Somerset, in England, have invented certain new and useful Improvements in Locking and Adjusting Devices, of which the following is a specification.

This invention relates to locking and adjusting devices and has for its object to enable a member to be securely locked against rotation with relation to a second member while at the same time permitting adjustment of the two members to be readily and accurately effected.

The invention is particularly applicable as a locking means for two relatively adjustable members which are screwed together, such as brake rods, gages, various parts of internal combustion engines, automobiles, &c., and in which parts of this character are subjected to vibration and shock and adjustment is frequently needed. A particularly useful application of the invention is to that type of valve for internal combustion engines, which comprises a valve spindle screw threaded to a tappet disk where, due to wearing of the parts of the valve mechanism adjustment is frequently required to insure the proper seating of the valve. According to this invention a spring member is provided which is keyed or similarly connected to one of two members or parts which are relatively adjustable by screwing, the spring member being formed so as to frictionally engage some part of the second member in a manner which will prevent relative rotation of the two members until the frictional grip of the spring member is relieved. The invention is simple, inexpensive to manufacture, easily applied, and has numerous advantages over the various devices of this general character which have been heretofore designed and constructed.

The invention may be put into practice in various ways but the accompanying drawings illustrate by way of example the application of the invention to the valve of an internal combustion engine. In these drawings, Figure 1 is a longitudinal sectional elevation of a valve with the present invention applied to the tappet disk thereof.

Fig. 2 is a plan or end view of the tappet disk and spring washer as shown in Fig. 1.

Fig. 3 is a sectional elevation of the tappet disk member alone.

Fig. 4 is an elevation of the end portion of the hollow valve spindle.

Fig. 5 is a plan of the same.

Fig. 6 is a sectional elevation of the spring washer, and

Fig. 7 is a plan of the same.

Like letters indicate like parts throughout the drawings.

The tappet disk A is as usual provided with a stem A' which is screw-threaded to engage the correspondingly screw-threaded interior of the hollow valve spindle B. The peripheral portion $A^2$ of the disk A is formed cylindrical as shown in Fig. 3 the thickness of the disk or depth of this cylindrical portion being in accordance with requirements. The spring washer comprises an annular disk part C having on one face and toward its periphery a flange C' of an internal diameter adapted to engage and frictionally grip the cylindrical periphery $A^2$ of the tappet disk A. On the opposite face of the disk C is a flange $C^2$ which serves to inclose the end of the valve spring which bears against that face of the disk C. The central portion of the washer is recessed as at $C^3$ and formed with a cylindrical part $C^4$ and a lug $C^5$ which projects into this cylindrical part. A radial cut $C^6$ is made right through the washer from the central opening.

On the end of the hollow valve spindle B is formed a longitudinal slot or recess B' adapted to be engaged by the lug $C^5$ which projects inwardly from the central part of the washer C. The latter is thus keyed to the valve spindle B and by means of its outwardly directed flange C' can grip the tappet disk A and lock it to the vale spindle.

In the face of the tappet disk A are formed a series of holes $A^3$ adapted to be engaged by a suitable tool which enables the disk to be rotated so as to screw the stem A' in or out of the valve spindle B. In order to release the grip of the spring washer on the tappet disk it is necessary to expand the washer or act on it so as to release this grip on the disk and this may be effected in various ways. For example a suitable tool may be inserted into the end of the radial cut C⁶ in the flange C² so as to merely spread this opening or spring apart the washer. Preferably, however, a tool is employed which has a handle and a curved arm shaped to lie closely around an arc of the flange C² a hook-like or other projection being formed on the end of this arm which can be inserted into the opening of the cut C⁶. When this tool is in position in engagement with the washer and the necessary tool is engaged with the holes A³ in the tappet disk A, by exerting circumferential pressure in opposite directions on the handles of the two tools the grip of the washer C on the disk A is relieved and the tappet disk A can be rotated relatively to the valve spindle B so as to effect the desired adjustment in the length of the spindle. As soon as pressure ceases to be exerted on the tool which is in engagement with the washer C the tappet disk A will be held by the washer against rotation relatively to the valve spindle B. The tool which is used to engage the washer is placed so that it can act on the washer in a clockwise or counter-clockwise direction according to but in the opposite direction to that in which it is desired to rotate the tappet disk.

As mentioned the washer is so constructed and arranged that one end of the spring controlling the valve bears against the face of the washer and through the washer exerts pressure on the tappet disk the annular disk portion C of the washer lying against the inner face of the tappet disk A. If the valve spring breaks the action of the locking device is not interfered with nor is the adjustment of the parts effected.

When assembling the parts difficulty may be experienced in bringing the key C⁵ into engagement with the recess B' especially when the device is applied to a valve spindle and the washer C has then to be pressed down against the action of the valve spring. This difficulty may however be obviated by making a cut C⁷ through the cylindrical part C⁴ of the washer at the side which carries the lug or key C⁵. A part of this key is then free to yield slightly relatively to the main part of the washer in the direction of the axis of the spindle. The washer C is then first placed in position on the tappet disk A with the flange C' gripping the periphery A² of the disk and the stem A' is now screwed into the spindle. If the end portion of the key C⁵ comes in contact with the end of the spindle B just before the key comes in line with the recess B' this part of the key will yield while the screwing of the stem into the spindle is continued and as soon as the recess B' and key C⁵ coincide the latter will spring into the recess and the washer will be automatically locked to the spindle. Thus the process of assembling the parts is greatly simplified as there is no occasion to hold one part relatively to the other but the spring having been put in place the tappet disk carrying the washer can be screwed straight on with the certainty that the washer will become keyed to the spindle when the stem A' has entered the spindle B to the required extent. The necessary adjustment in the length of the spindle is then effected in the manner described by relaxing the grip of the washer C on the disk A when the latter can be rotated relatively to the spindle to the extent desirable.

There may be combined with the above described device some means which will enable the extent to which the adjustment is effected to be exactly determined. For example some portion of the edge of one of the rotatable members may be marked with graduations bearing a definite relation to the number of screw-threads to the inch on the stem or equivalent part of this member which is in engagement with the second member with relation to which the first member is rotatably adjustable. By means of marks on the periphery of the washer or spring member or by a pointer or by a suitably arranged part of the second member the marks on the first member can be read off. It thus becomes possible to rotate the two members relatively and set the parts so as to adjust a length to a fraction of an inch and the setting will not be altered when the spring member is released in order to effect the locking of the parts.

As an instance in the case where the invention is applied to the locking of the tappet disk of the valve of an internal combustion engine as illustrated in the drawings the graduations may be arranged in the following manner. The face of the tappet disk A may be provided with graduations around its edge as shown in Fig. 2, these graduations bearing a definite relation to the screw-threads on the stem A'. Thus if the stem A' is threaded with twenty-five threads to the inch and the disk is graduated around its edge into forty parts the adjustment in the length of the valve stem can be made to one-ten-thousandth of an inch or less by estimation.

The construction of the parts of the relatively rotatable members as also of the washer or spring member may vary in accordance with the purpose for which the device or mechanism to which the invention is applied is used and the details of construction generally may be modified in accordance with requirements.

What I claim as my invention and desire to secure by Letters Patent is:—

1. In a locking and adjusting device the combination of a member having a screw-threaded part, a second member a portion of which is screw-threaded and engaged by the screw-threaded part of the first member, and a spring member keyed to one of the said members and formed so as to frictionally engage with the same force at all times some part of the other of these two members whatever their relative positions in a manner which will prevent relative rotation of the two members until the frictional grip of the spring member is relaxed as set forth.

2. In a locking and adjusting device the combination of a member having a screw-threaded part and a cylindrical part, a second member a portion of which is screw-threaded and engaged by the screw-threaded part of the first member, and a spring member keyed to the second of the said members and provided with a cylindrical part adapted to frictionally engage with the same force at all times the cylindrical part of the first member in a manner which will prevent relative rotation of the two members whatever their relative positions until the frictional grip of the spring member on the first member is relaxed as set forth.

3. In a locking and adjusting device the combination of a member having a screw-threaded projection, a second member having a hollow internally screw-threaded part which is engaged by the projection of the first member, and a spring member keyed to one of the said members and formed so as to frictionally engage with the same force at all times some part of the other of these two members whatever their relative positions in a manner which prevents relative rotation of the two members until the frictional grip of the spring member is relaxed as set forth.

4. In a locking and adjusting device the combination of a member having a screw-threaded projection and a cylindrical part, a second member having a hollow internally screw-threaded part which is engaged by the projection of the first member, and a spring member keyed to the second of the said members and provided with a cylindrical part adapted to frictionally engage with the same force at all times the cylindrical part of the first member in a manner which will prevent relative rotation of the two members whatever their relative positions until the frictional grip of the spring member on the first member is relaxed as set forth.

5. In a locking and adjusting device the combination of a member having a screw-threaded part, a second member a portion of which is screw-threaded and engaged by the screw-threaded part of the first member, and an annular disk-like member having a central opening so formed as to engage one of the said members in a manner which prevents relative rotation between that member and the disk-like member the latter having also a flange adapted to frictionally engage with the same force at all times the other of the said members whatever their relative positions and a cut extending radially from the central opening of the disk-like member to its periphery as set forth.

6. In a locking and adjusting device the combination of a member having a screw-threaded part, a second member a portion of which is screw-threaded and engaged by the screw-threaded part of the first member, and a washer with a radial cut through it and having an inwardly directed projection adapted to engage one of the said members and a flange adapted to frictionally engage the other of said members in a manner which will prevent relative rotation of the two members until the frictional grip of the spring member is relaxed as set forth.

7. In a locking and adjusting device the combination of a member having a screw-threaded projection and a cylindrical part, a second member having a hollow internally screw-threaded part which is engaged by the projection of the first member, and an annular disk-like member having a central opening so formed as to engage the second of the said members in a manner which will prevent relative rotation between that member and the disk-like member the latter having also a flange adapted to frictionally engage the cylindrical part of the first of the said members and a cut extending radially from the central opening of the disk-like member to its periphery as set forth.

8. In a locking and adjusting device the combination of a member having a screw-threaded projection and a cylindrical part, a second member having a hollow internally screw-threaded part which is engaged by the projection of the first member, and a washer with a radial cut through it and having an inwardly directed projection adapted to engage the hollow internally screw-threaded part of the second of the said members and having also a flange adapted to frictionally engage the cylindrical part of the first of the said members in a manner which will prevent relative rotation of the two members until the frictional grip of the washer on the first of the said members is relaxed as set forth.

9. In a locking and adjusting device the combination of a member having a screw-threaded part, a second member a portion of which is screw-threaded and engaged by the screw-threaded part of the first member, and a washer with a radial cut through it and having an inwardly directed projection forming a key which can yield slightly in the direction of the axis of the said engaging members and is adapted to engage one of these members the washer having also a flange adapted to frictionally engage the other of the said members in a manner which will prevent relative rotation of the two members until the frictional grip of the washer is relaxed as set forth.

10. In a locking and adjusting device the combination of a member having a screw-threaded projection and a cylindrical part, a second member having a hollow internally screw-threaded part which is engaged by the projection of the first member the end of the hollow part of this second member being recessed, and a washer with a radial cut through it and having an inwardly directed projection forming a key which can yield slightly in the direction of the axis of the said engaging members and is adapted to engage the recessed end part of the second of these members the washer having also a flange adapted to frictionally engage the cylindrical part of the first of the said members in a manner which will prevent relative rotation of the two members until the frictional grip of the washer on the first of the said members is relaxed as set forth.

11. In a locking and adjusting device the combination of a member having a screw-threaded part and a cylindrical part, a second member a portion of which is screw-threaded and engaged by the screw-threaded part of the first member the end of the screw-threaded portion of the second member being recessed, and an annular disk-like member having a central opening with a projection directed into this opening and constituting a key adapted to engage the recessed end part of the second of the said members and having a flange adapted to frictionally engage the cylindrical part of the first of the said members the disk-like member having also a cut extending radially from the central opening therein to its periphery as set forth.

12. In a locking and adjusting device the combination of a member having a screw-threaded part, a second member a portion of which is screw-threaded and engaged by the screw-threaded part of the first member the end of the screw-threaded portion of this second member being recessed, and a washer with a radial cut through it and having an inwardly directed projection forming a key in which is a cut extending through the projection in a direction approximately parallel to the face of the washer so that a part of the key can yield slightly in the direction of the axis of the said engaging members and spring into engagement with the recessed end part of the second of these members the washer having also a flange adapted to frictionally engage the first of these members in a manner which will prevent relative rotation of the two members until the frictional grip of the washer is relaxed as set forth.

13. In a locking and adjusting device the combination of a member having a screw-threaded projection and a cylindrical part, a second member having a hollow internally screw-threaded part which is engaged by the projection of the first member the end of the hollow part of this second member being recessed, and a washer with a radial cut through it and having an inwardly directed projection forming a key in which is a cut extending through the projection in a direction approximately parallel to the face of the washer so that a part of the key can yield slightly in the direction of the axis of the said engaging members and spring into engagement with the recessed end part of the second of these members the washer having also a flange adapted to frictionally engage the cylindrical part of the first of the said members in a manner which will prevent relative rotation of the two members until the frictional grip of the washer on the first of the said members is relaxed as set forth.

14. In a locking and adjusting device the combination of a member having a disk-like head provided with a cylindrical part and a screw-threaded projection extending from the center of the head, a second member having an internally screw-threaded tubular portion which is engaged by the projection of the first member the end of the tubular portion being recessed, and a washer with a radial cut through it and having an inwardly directed projection adapted to engage the recessed end of the tubular portion of the second of the said members and having also a flange adapted to frictionally engage the cylindrical part of the head of the first of the said members in a manner which will prevent relative rotation of the two members until the frictional grip of the washer on the first of the said members is relaxed as set forth.

15. In a locking and adjusting device the combination of a member having a disk-like head provided with a cylindrical part and a screw-threaded projection extending from the center of the head, a second member having an internally screw-threaded tubular portion which is engaged by the projection of the first member the end of the tubular portion being recessed, and a washer with a radial cut through it and having an inwardly directed projection forming a key in which is a cut extending through the projection in a direction approximately parallel to the face of the washer so that part of the key can yield slightly in the direction of the axis of the said engaging members and spring into engagement with the recessed end of the tubular portion of the second of the said members the washer having also a flange adapted to frictionally engage the cylindrical part of the head of the first of the said members in a manner which will prevent relative rotation of the two members until the frictional grip of the washer on the first of the said members is relaxed as set forth.

In testimony whereof I have signed my name to this specification in the presence of two subscribing witnesses.

GEORGE MORTIMER.

Witnesses:
ELIZABETH SARAH SCARLETT,
VIOLET MIRRIAM WRIGHT.

Copies of this patent may be obtained for five cents each, by addressing the "Commissioner of Patents, Washington, D. C."